United States Patent
Fischer et al.

(10) Patent No.: US 8,275,988 B2
(45) Date of Patent: Sep. 25, 2012

(54) VERIFICATION OF SYSTEM INFORMATION IN WIRELESS COMMUNICATION SYSTEM

(75) Inventors: Patrick Fischer, Paris (FR); Sergey Karmanenko, St. Petersburg (RU)

(73) Assignee: LG Electronics Inc., Seoul (KR)

(*) Notice: Subject to any disclaimer, the term of this patent is extended or adjusted under 35 U.S.C. 154(b) by 272 days.

(21) Appl. No.: 12/525,807

(22) PCT Filed: Feb. 5, 2008

(86) PCT No.: PCT/KR2008/000750
§ 371 (c)(1),
(2), (4) Date: Mar. 15, 2010

(87) PCT Pub. No.: WO2008/097044
PCT Pub. Date: Aug. 14, 2008

(65) Prior Publication Data
US 2010/0191965 A1    Jul. 29, 2010

Related U.S. Application Data

(60) Provisional application No. 60/888,503, filed on Feb. 6, 2007.

(51) Int. Cl.
*H04L 29/06* (2006.01)
(52) U.S. Cl. ......... 713/168; 455/410; 455/411; 455/434
(58) Field of Classification Search .............. 713/168
See application file for complete search history.

(56) References Cited

U.S. PATENT DOCUMENTS

| | | | |
|---|---|---|---|
| 6,385,455 B1* | 5/2002 | St. Clair et al. | 455/450 |
| 6,628,946 B1 | 9/2003 | Wiberg et al. | |
| 6,952,583 B1 | 10/2005 | Park et al. | |
| 7,020,455 B2 | 3/2006 | Krishnarajah et al. | |
| 7,079,840 B2 | 7/2006 | Roberts et al. | |
| 7,366,496 B2* | 4/2008 | Vialen et al. | 455/410 |
| 2002/0101459 A1* | 8/2002 | Herle et al. | 345/866 |
| 2002/0177439 A1* | 11/2002 | Karlsson et al. | 455/433 |
| 2003/0100291 A1* | 5/2003 | Krishnarajah et al. | 455/410 |
| 2004/0038668 A1* | 2/2004 | Ho | 455/411 |
| 2004/0162055 A1* | 8/2004 | Wu | 455/410 |
| 2004/0242195 A1* | 12/2004 | Chun et al. | 455/410 |
| 2005/0015583 A1* | 1/2005 | Sarkkinen et al. | 713/150 |
| 2005/0030903 A1* | 2/2005 | Al-Zain et al. | 370/252 |
| 2005/0169205 A1* | 8/2005 | Grilli et al. | 370/313 |
| 2006/0229102 A1* | 10/2006 | Kitazoe et al. | 455/560 |
| 2007/0117563 A1* | 5/2007 | Terry et al. | 455/434 |
| 2007/0155339 A1* | 7/2007 | Jiang | 455/73 |

OTHER PUBLICATIONS

Brawerman et al., Towards a Fraud-Prevention Framework for Software Defined Radio Mobile Devices, Aug. 2005, EURASIP Journal on Wireless Communications and Networking, Issue 3, pp. 401-412.*

Geir M. Koien, Privacy Enhanced Cellular Access Security, Sep. 2005, ACM workshop on Wireless Security 2005, pp. 57-66.*

* cited by examiner

*Primary Examiner* — Taghi Arani
*Assistant Examiner* — Kenneth Chang
(74) *Attorney, Agent, or Firm* — Lee, Hong, Degerman, Kang & Waimey

(57) ABSTRACT

The present invention relates to a method for communicating between a network and a mobile terminal. The method comprises possessing at least one configuration parameter, and transmitting a message to the network, wherein the message includes information for verifying the authenticity of the at least one configuration parameter to the network, and wherein the information for verifying the authenticity of the at least one configuration parameter is calculated using an integrity key.

8 Claims, 11 Drawing Sheets

PRIOR ART

PRIOR ART

PRIOR ART

Logical channels mapped onto transport channels, seen from the UE side

Logical channels mapped onto transport channels, seen from the UTRAN side
PRIOR ART UE State Transitions
PRIOR ART

PRIOR ART

VERIFICATION OF SYSTEM INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2008/000750, filed on Feb. 5, 2008, which claims the benefit of U.S. Provisional Application Ser. No. 60/888,503, filed on Feb. 6, 2007, the contents of which are all incorporated by reference herein in their entirety.

TECHNICAL FIELD

The present invention relates to communicating between a network and a mobile terminal in a wireless communication system, and more particularly, to verifying the authenticity of system information communicated between the network and the mobile terminal.

TECHNICAL FIELD

Background Art

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources.

The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on the S-CCPCH, and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on the P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which transmits a fixed pattern.

The system information comprises information on neighboring cells, configuration of the RACH and FACH transport channels, and the configuration of MICH and MCCH which are channels that are dedicated channels for the MBMS service.

Each time the UE changes the cell it is camping (in idle mode) or when the UE has selected the cell (in CELL_FACH, CELL_PCH or URA_PCH) state, the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general, UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

FIG. 8 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3GPP LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) 105 in the LTE system.

In 3GPP LTE systems, system information (SI) carries different cell and network specific parameters to a UE for successful attachment to a network. The system information also facilitates paging and allows the UE to use different network services. Every cell continually broadcasts its system information on a channel, such as a broadcast control channel (BCCH). Moreover, every UE registering to the network or performing a handover to a particular cell first reads the cell specific information.

In the conventional art, the broadcast of system information is not protected for security. Accordingly, problems may arise. For example, if an attacker can imitate network behavior and broadcast a set of system information, i.e., a master information block, scheduling blocks and system information blocks, having the same value tag and identities as a network a UE is currently in, the attacker can manage to introduce wrong SI parameters/predefined configurations to the UE.

The attacker may use a false base station for this action, or may make standalone broadcasts to mask under the cell-ID of a real neighboring cell or different cell-ID.

An attacker can introduce incorrect system information, such as wrong predefined network configurations, measurement configurations, constants, counters, etc. in a number of ways. For example, the UE can switch on, or enter a new public land mobile network (PLMN) using incorrect system information having a correct value tag.

In another example, the attacker can indicate that the SI has changed by paging all UEs using an unprotected paging message (similar to Paging Type 1 in UMTS). Once all UEs have read the SI, the attacker can change its value tag to the value tag of a real neighboring cell, and subsequently introduce wrong SI (configuration parameters).

In a further example, the attacker can introduce wrong parameters on the SI (e.g. scheduling blocks, SFN, value tag, PLMN ID, cell access restriction parameters), which the UE reads every time it enters a new cell. Consequently, this has the effect of the UE camping on a false base station, and may result in the UE detaching from the network.

Moreover, in UMTS, network predefined configurations are broadcast in SIB type 16, which has multiple occurrences for each predefined configuration. Different parts of the system may provide the UE with one or more predefined UTRAN configurations, comprising radio bearer, transport channel and physical channel parameters. The UE should store all relevant IEs included in the SIB. The availability of predefined configurations is communicated to the network during the call establishment, and thus, if available the network relies on this information instead of transmitting the complete configuration to the UE.

Thus, a potential attacker can send wrong PhyCH or TrCH parameters such as a spreading factor (SF) or transport format combination set (TFCS), written under the same value tag and identity as in a current network. At call establishment, the configuration stored in the UE will be different from the configuration that the network supposes. Accordingly, the UE will apply the wrong configuration, and the communication will fail or the UE will detach from the network until the next switch off/switch on, or until entering a new scope area (next re-read of system information). Furthermore, any following scheduled broadcasts of system information by the network will be ignored by the UE due to the fact that the value tag and identities are the same. Similar threats can be expected to other information that the UE uses based on the system information, e.g. measurement configurations.

DISCLOSURE OF INVENTION

Technical Solution

The present invention is directed to verifying the authenticity of system information communicated between a network and a mobile terminal in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating between a network and a mobile terminal, the method comprising possessing at least one configuration parameter, and transmitting a message to the network, wherein the message includes information for verifying the authenticity of the at least one configuration parameter to the network, and wherein the information for verifying the authenticity of the at least one configuration parameter is calculated using an integrity key.

Preferably, the information for verifying the authenticity of the at least one configuration parameter is further calculated using at least one of an RRC message, an identification of the at least one configuration parameter to be verified, and a value of the at least one configuration parameter. Preferably, the message is transmitted for establishing a connection with the network. Preferably, the at least one configuration parameter is received from the network prior to establishing a connection with the network.

In one aspect of the invention, the method further comprises only using a configuration parameter that is known by the network to calculate the information. Alternatively, the method further comprises not using a configuration parameter that is not known by the network to calculate the information. Preferably, the network indicates whether a configuration parameter is known by the network.

Preferably, the information for verifying the authenticity of the at least one configuration parameter is calculated using a checksum value calculated using the at least one configuration parameter. Preferably, if the at least one configuration parameter is not verified, the method further comprises erasing the at least one un-verified configuration parameter, and transmitting a message for establishing a connection with the network.

In accordance with another embodiment of the present invention, a method for communicating between a network and a mobile terminal comprises receiving a message from a mobile terminal, wherein the message includes information for verifying the authenticity of at least one configuration parameter possessed by the mobile terminal, and wherein the information for verifying the authenticity of the at least one configuration parameter is calculated by the mobile terminal using an integrity key.

Preferably, the information for verifying the authenticity of the at least one configuration parameter is further calculated using at least one of an RRC message, an identification of the at least one configuration parameter to be verified, and a value of the at least one configuration parameter. Preferably, the message is received from the mobile terminal for establishing a connection with the network. Preferably, the at least one configuration parameter is transmitted to the mobile terminal prior to establishing a connection with the network.

In one aspect of the invention, the mobile terminal only uses a configuration parameter that is known by the network to calculate the information. Alternatively, the mobile terminal does not use a configuration parameter that is not known by the network to calculate the information. Preferably, the network indicates whether a configuration parameter is known by the network.

Preferably, the information for verifying the authenticity of the at least one configuration parameter is calculated using a checksum value calculated using the at least one configuration parameter. Preferably, if the at least one configuration parameter is not verified, the method further comprises instructing the mobile terminal to erase the at least one un-verified configuration parameter; and receiving a message from the mobile terminal for establishing a connection with the network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

MODE FOR THE INVENTION

Figure 1:
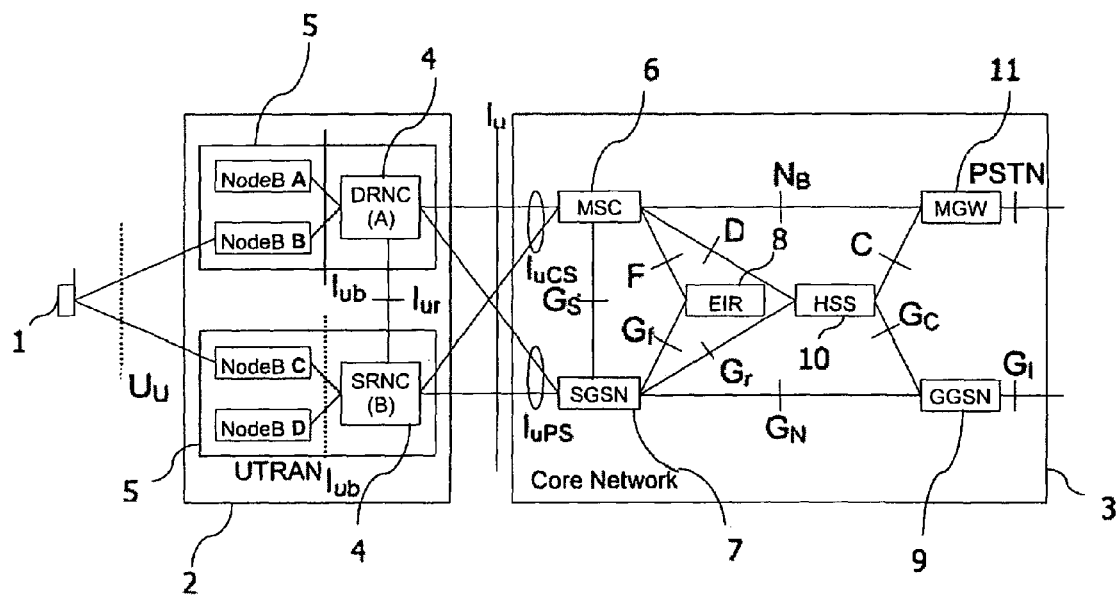
FIG. 1 illustrates a conventional UMTS network.
Figure 2:
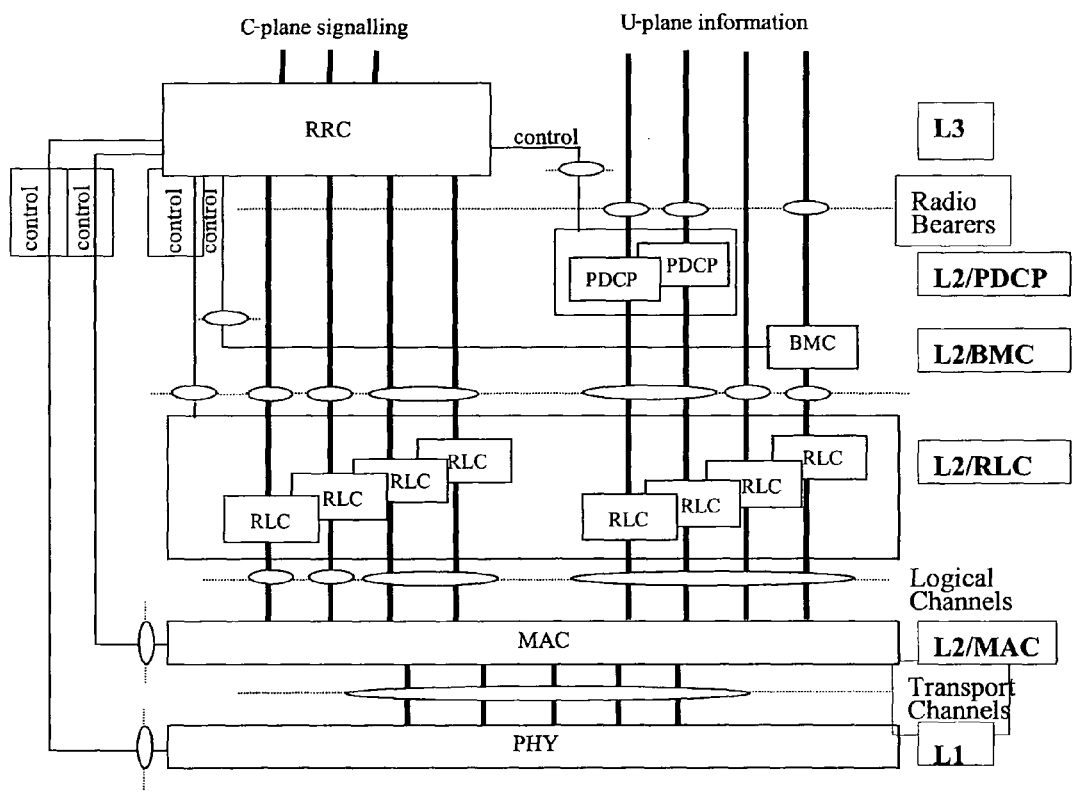
FIG. 2 illustrates a conventional radio interface protocol between a UE and UTRAN.
Figure 3:
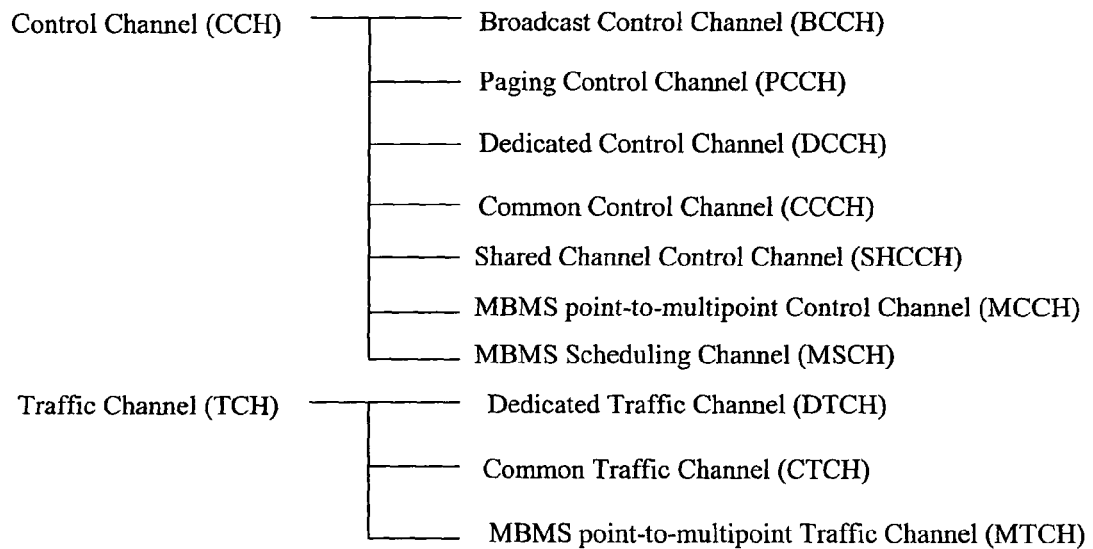
FIG. 3 illustrates logical channel structure.
Figure 4:
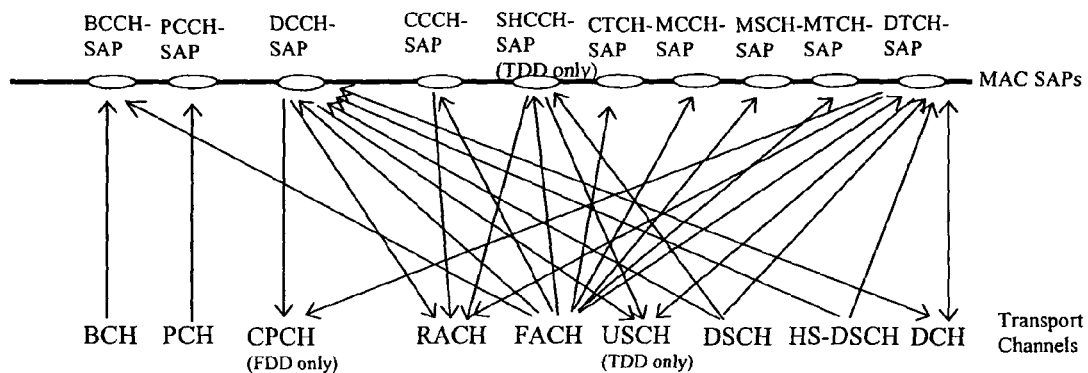
FIG. 4 illustrates possible mappings between logical channels and transport channels from the UE perspective.
Figure 5:
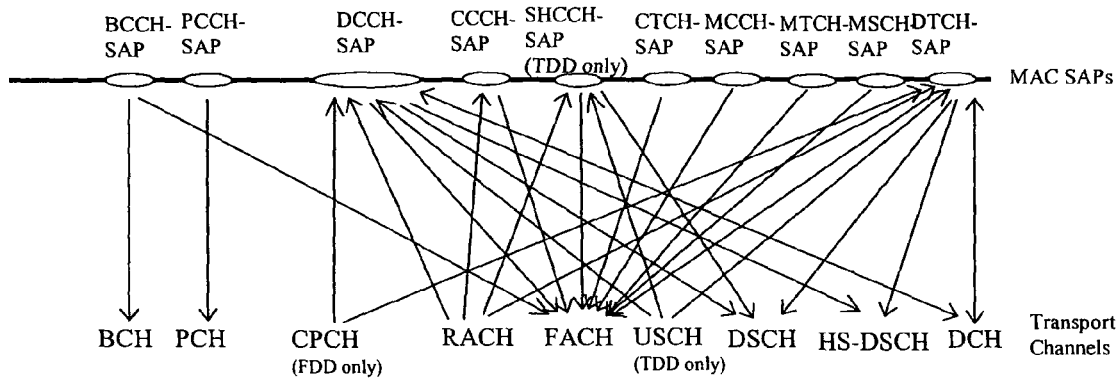
FIG. 5 illustrates possible mappings between logical channels and transport channels from the UTRAN perspective.
Figure 6:
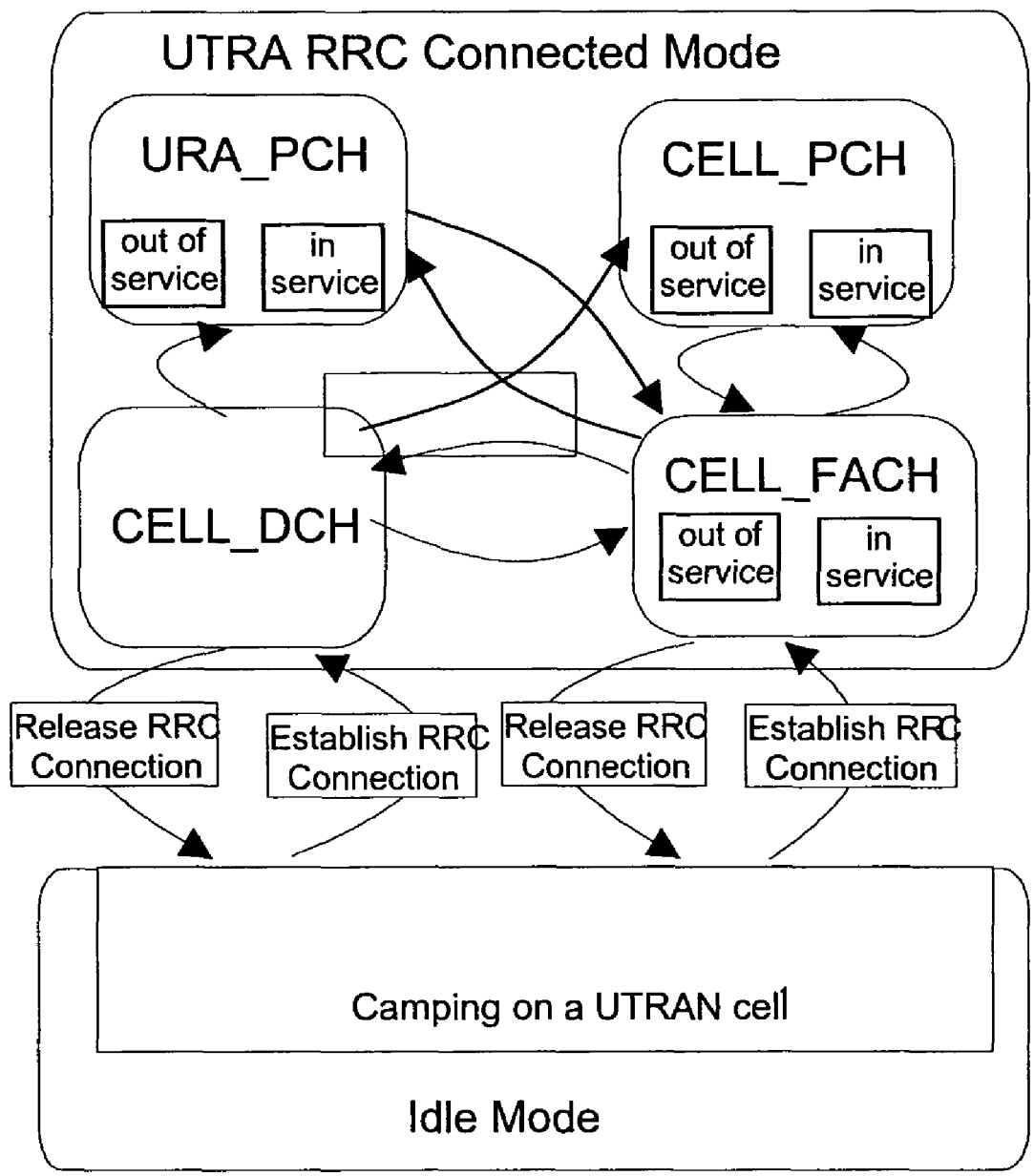
FIG. 6 illustrates possible UE state transitions.
Figure 7:
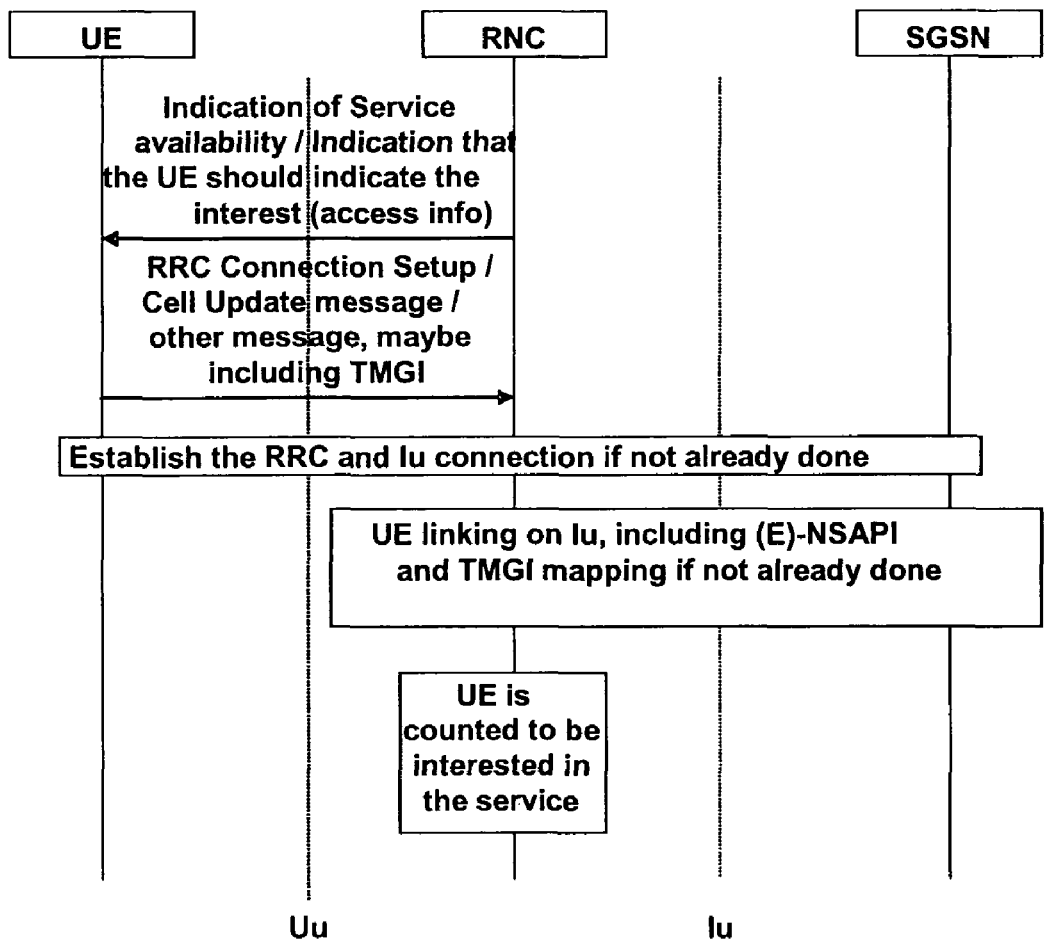
FIG. 7 illustrates a typical counting procedure.
Figure 8:
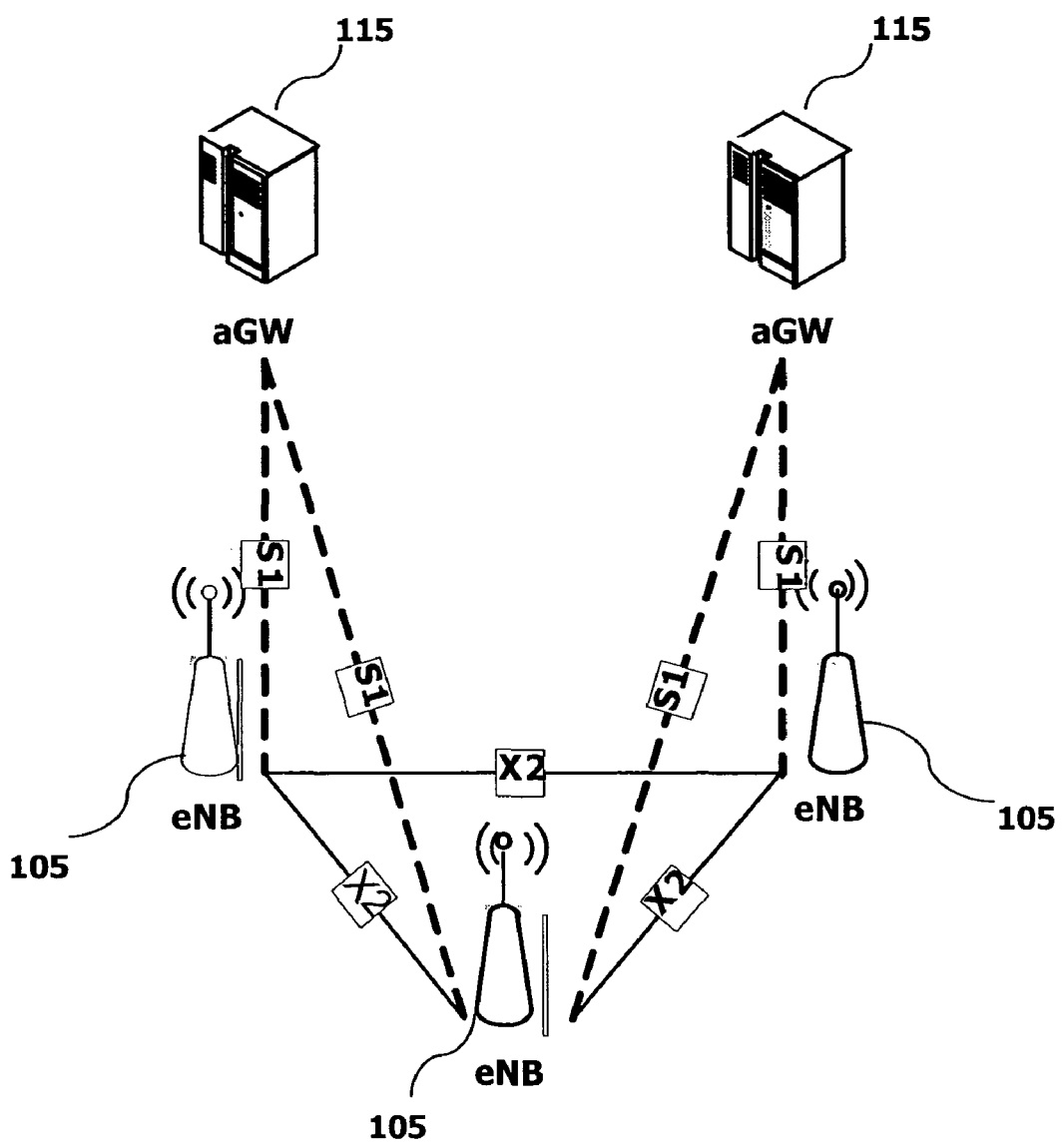
FIG. 8 illustrates the architecture of an LTE system.

The present invention relates to verifying the authenticity of system information communicated between a network and a mobile terminal in a wireless communication system.

In accordance with a preferred embodiment of the present invention, system information may be divided into several classifications. In one classification, the system information may be valid across multiple cells. This includes A-GNSS assistance data, PLMN ID(s), tracking area IDs, predefined configuration information and a system frame number which does not change from cell to cell in a possibly synchronized network.

The system information may also be classified as information needed to be read during a cell/PLMN search. In order to support full mobility within a serving frequency layer, the UE performs a cell search rather often. Thus, it is preferable that information needed for a cell search is readily available, which improves cell search times and minimizes UE power consumption. If system information decoding is needed for identifying a cell, fast system information reception is needed to avoid long identification times. For optimizing a PLMN search, and to make a PLMN search fast and non-complex, information needed for the PLMN search is preferably easily available. System information to be read during a cell/PLMN search may include PLMN ID(s) and a measurement cell ID.

The system information may also be classified as information the UE needs prior to camping in a cell. Before the UE camps into the cell, the UE preferably knows any access related parameters to avoid camping into a cell where the UE cannot make access. Thus, prior to camping in the cell, the UE preferably knows of any cell access restriction parameters, such as tracking area identities, cell barring status and cell reservation status, and radio access limitation parameters.

The system information may also be classified as information the UE needs before accessing (transmitting to/receiving from) a cell. After the UE has camped to a cell, the UE is ready to start accessing the cell when needed. Parameters needed prior to accessing may include a system frame number (SFN), L1 parameters and RACH parameters.

L1 parameters include, for example, carrier bandwidth, carrier center frequency, cyclic prefix parameters, MIMO related parameters, band information and L1/L2 signaling channel structure parameters. RACH parameters include, for example, RACH scheduling information, RACH sequences, access class restrictions, persistence values, other RACH-related parameters and RACH power control parameters.

The system information may also be classified as information the UE needs while camped in the cell. For example, when the UE is camped in the cell, the UE needs to continue measuring neighboring cells in order to stay camped. Such information may include measurement parameters, secondary NAS parameters, secondary UE timer values, paging parameters, clock time, E-MBMS service parameters and signaling radio bearer parameters. The measurement parameters may include cell reselection parameters for UEs in RRC_IDLE state, neighbor cell parameters for UEs in RRC_CONNECTED state (for handover and error recovery cases, for example), neighbor cell lists needed to start neighbor cell measurements, other 3GPP RAT information, and information of non-3GPP access systems (e.g. WIMAX system).

In accordance with a preferred embodiment of the present invention, the distribution of system information may have two distinctive parts, such as a static part and a flexible part. The static part is sent more often in the cell, e.g., once per frame, and has a limited capacity for information transfer. The flexible part has a flexible amount of scheduled resources available. Thus, most SI information is contained in the flexible part.

Preferably, parameters included in the static part include L1 information for decoding other information, a measurement cell ID, cell access restriction parameters, scheduling parameters and a value_tag(s). The cell access restriction parameters may include tracking area identities, cell barring and cell reservation status, radio access limitation parameters and PLMN IDs. The value_tag(s) informs whether information on the flexible part has changed and is needed to avoid having the UE re-read any unchanged information.

Preferably, parameters included in the flexible part include a scheduling block, access parameters, measurement related parameters and non-vital information. The scheduling block schedules information of a secondary part of the system information. The access parameters may include parameters not present in a primary part of the system information (e.g. some L1 parameters), RACH parameters, power control parameters, paging parameters and timer values needed for operating in the cell and network. The measurement related parameters may include neighbor cell lists, cell selection/reselection parameters and measurement control information. The non-vital information may include a clock time, positioning information, service parameters (e.g. MBMS parameters) and secondary NAS parameters.

Additionally, the system information may also be distributed via a dedicated part embedded in an RRC message for sending system information elements in unicast mode, such as for handover or positioning purposes. During a handover operation, the UE requires some information regarding a neighboring cell in order to access the cell and limit interruption times caused by the handover execution. Thus, when the UE receives a handover command, the UE preferably needs the following information from a target cell: 1) all information in the static part; 2) most of the information from the access parameters; and 3) a system frame number to minimize interruption times during the handover procedure.

As stated above, the current broadcast of system information is prone to attackers because of the lack of security protection when broadcasting the system information in a point-to-multipoint manner. In accordance with an embodiment of the present invention, one security solution is to authenticate to the UE the source origin, i.e., the cell belonging to the network, when the system information is transmitted. Thus, a message sent from the network may contain information from which the UE through some algorithm, for example, can verify whether the sender is legitimate, i.e., that the sender is indeed the network and not an untrustworthy entity. Various alternatives for providing the source origin to the UE will be described below.

In accordance with one embodiment of the present invention, a source origin may be authenticated using public key cryptography (PKI). Public key cryptography is a form of cryptography which generally allows users to communicate securely without having prior access to a shared secret key. This is done by using a pair of cryptographic keys, designated as a public key and a private key, which are related mathematically. Forms of public key cryptography include public key encryption, a public key digital signature and key agreement.

In public key encryption, a message is kept secret from anyone not possessing a specific private key. In a public key digital signature, anyone is allowed to verify whether a message was created with a specific private key. In key agreement, two parties that may not initially share a secret key are generally allowed to agree on a secret key.

Figure 9:
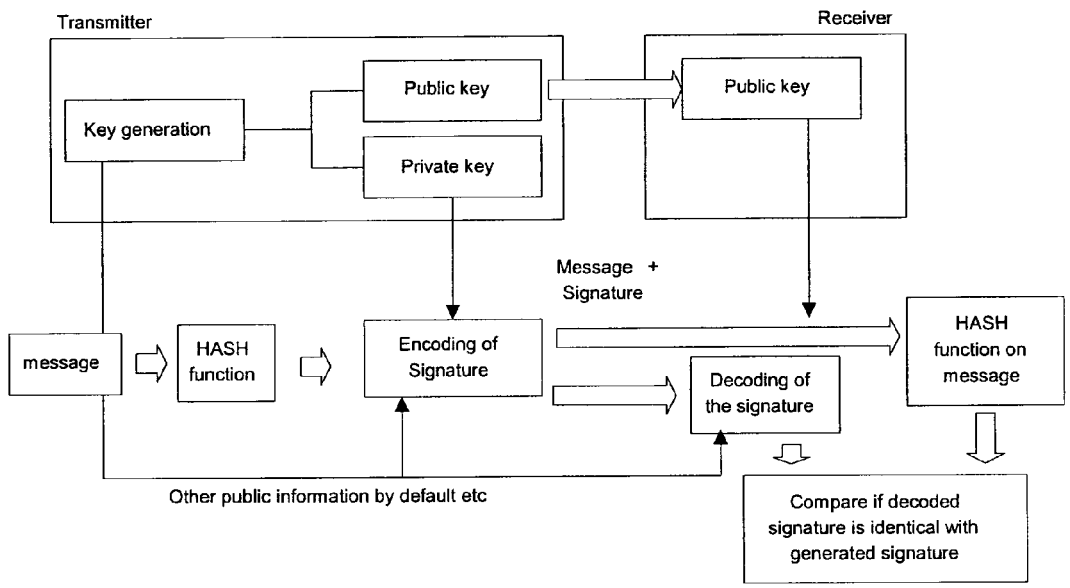
FIG. 9 illustrates an example of a public key digital signature in accordance with one embodiment of the present invention.

FIG. 9 illustrates an example of a public key digital signature. In accordance with the present invention, public key cryptography may be used to authenticate a message. To ensure that a message is sent by a trustworthy transmitter, the transmitter sends a public key via a secure connection to the receiver. Thereafter, a two-step approach is implemented for authentication, where a first keyless algorithm is used to generate a signature of the message, typically called a HASH function, and a second algorithm using private and public keys is used to encrypt/decrypt the signature. Notably, the HASH function makes it very difficult to build a message for which the HASH function will create a given signature.

Preferably, when a transmitter wants to transmit a message to the receiver, the transmitter will calculate a signature (also called a MAC) based on the message, signed with a HASH function. A private key and other information may be sent to the receiver beforehand or may be fixed in the algorithm. The transmitter then sends the signed message together with the MAC to the receiver. Using the public key previously transmitted by the transmitter, the receiver can then check whether the signature was created with a private key related to the public key, or whether the signature was not created with the private key. A private/public key encryption algorithm is then applied on the signature that is output by the HASH function. This authentication scheme is shown in FIG. 9.

In general, many algorithms are available for public key encryption and signatures, e.g. DSA or RSA algorithms which are already used in IETF RFC 2459, or elliptic curves algorithms. Hash functions that can be used are generally known. Examples of widely know hash functions include SHA-1, SHA-224, SHA-256, SHA-384, and SHA-512.

In accordance with one embodiment of the present invention, a source origin may be authenticated using time efficient stream loss-tolerant authentication (TESLA). TESLA is an efficient broadcast authentication protocol with low communication and computation overhead, which scales to large numbers of receivers, and tolerates packet loss. Despite using purely symmetric cryptographic functions (MAC functions), TESLA achieves asymmetric properties. TESLA prefers that receivers are loosely time-synchronized with a sender and also needs an efficient mechanism to authenticate keys at the receiver. TESLA is based on the principle of a one-way chain.

Figure 10:
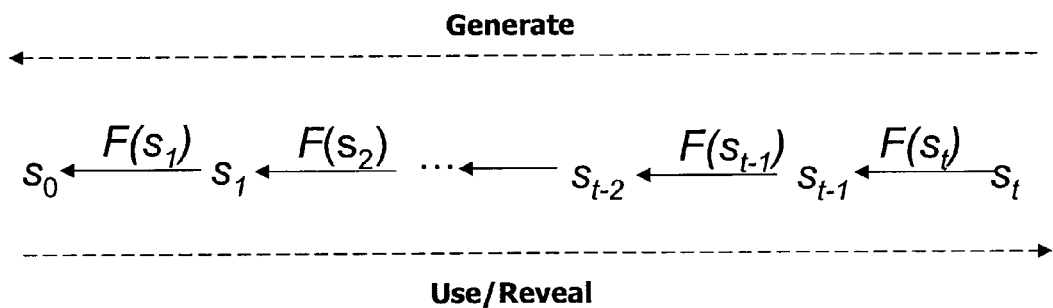
FIG. 10 illustrates a one-way chain construction in accordance with one embodiment of the present invention.

One-way chains are widely-used cryptographic primitives. FIG. 10 illustrates a one-way chain construction. To generate a chain of length, the last element of the chain S is randomly selected. The chain is generated by repeatedly applying a one-way function F. Finally, $S0$ is a commitment to the entire one-way chain, and any element of the chain through $S0$ can be verified, e.g. to verify that element $Si$ is indeed the element with index i of the hash chain, $Fi(Si)=S0$ is checked. The chain can be created all at once and each element of the chain can be stored. Otherwise, S can be stored and any other element can be computed on demand.

In accordance with one embodiment of the present invention, countermeasures are provided to take into account the complexity and issues related to the implementation of the above-mentioned authentication methods. The countermeasures are based on the ability of the receiver to interact with the sender, i.e., the ability to communicate information related to the receiver's existing system information before call establishment. Preferably, the countermeasures can identify whether system information is wrong so that a UE can take actions to reconnect to a network.

Figure 11:
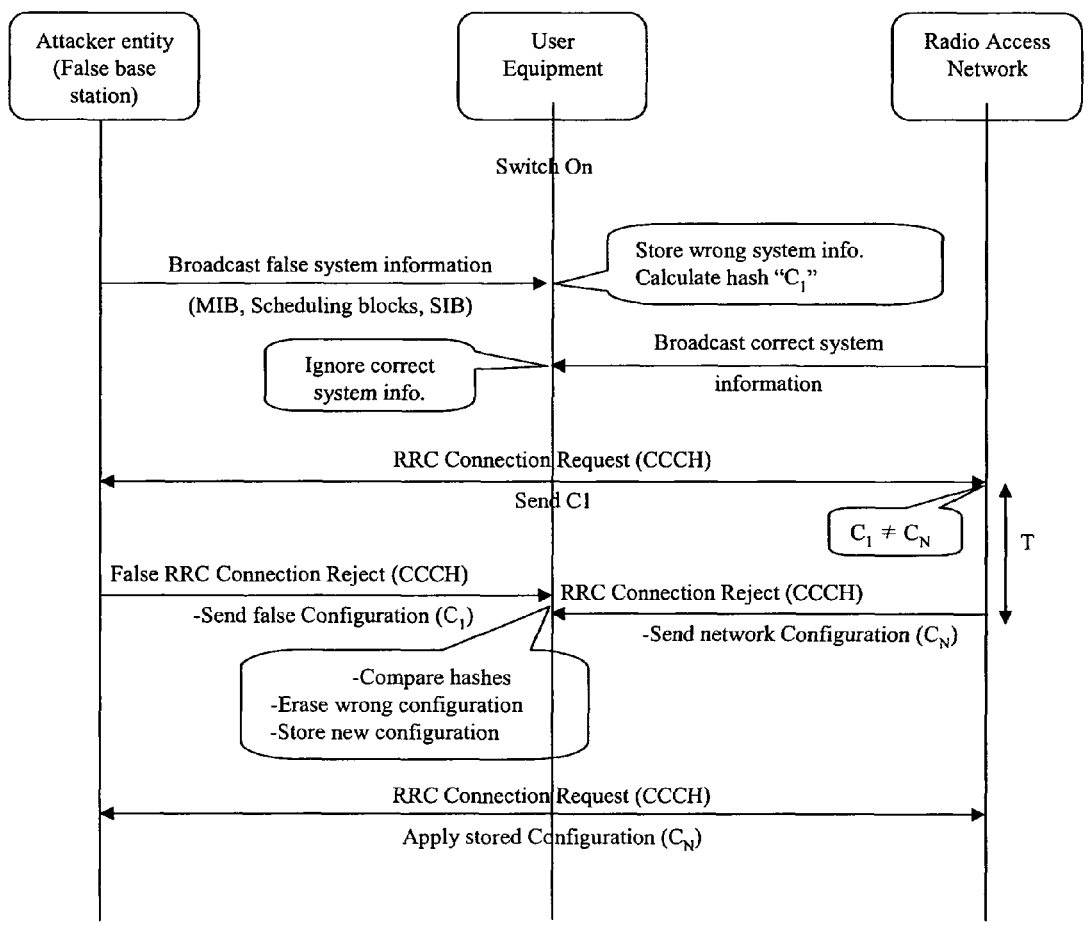
FIG. 11 illustrates a signaling sequence using a checksum solution in accordance with one embodiment of the present invention.

FIG. 11 illustrates a signaling sequence using a checksum solution. The UE calculates a checksum (using an appropriate CRC or hash function) for received configuration information (system information) whenever there is no stored configuration information with the same identity/value tag. Preferably, in a first RRC Connection Request message, the UE may send the checksum to allow a RAN node to check whether the configuration information is correct. If the UE has incorrect configuration information, the network can instruct the UE to erase the incorrect configuration information and subsequently send the appropriate configuration information to the UE for use.

In one aspect of the invention, the UE may prevent against the repeated broadcast/transmission of the same incorrect configuration information by first storing its current "incorrect" checksum. Thereafter, a new checksum can be calculated after a next broadcast of system information and compared with the stored checksum. Accordingly, if the stored checksum is equal to the new checksum, then the new configuration information can be ignored because it is equivalent to the current configuration information. Conversely, if the stored checksum is not equal to the new checksum, then the new configuration information is different from the current configuration information and can be stored.

In another aspect of the invention, the UE may prevent against the symmetrical introduction of incorrect system information by an attacker in a false RRC message. This is a case where the attacker can change the parameters of the incorrect system information the attacker broadcasts. Preferably, the UE is capable of storing more than one predefined configuration information set having the same network identity during some small time interval. For example, the UE may store configurations received from the network and the attacker. Accordingly, if the UE receives two new configuration information sets during the small time interval, the UE preferably stores both and tries to connect using the first of the two. If the connection using the first predefined configuration information set fails, the UE can use the other predefined configuration information set to connect.

In accordance with an embodiment of the present invention, for an LTE system, security association between the UE and the network is maintained when the UE is in idle state. RRC security context is established and started whenever the RRC connection is established. Thus, at connection establishment (switching from LTE_Idle to LTE_Active) every signaling message is integrity protected if the UE is authenticated to the network. Accordingly, the integrity protected RRC message is preferably used to verify the correctness of system information received by the UE while attaching to a new cell. To save uplink resources, an ordinary message for connection setup may be used, such as an LTE RRC Connection Request message.

Figure 12:
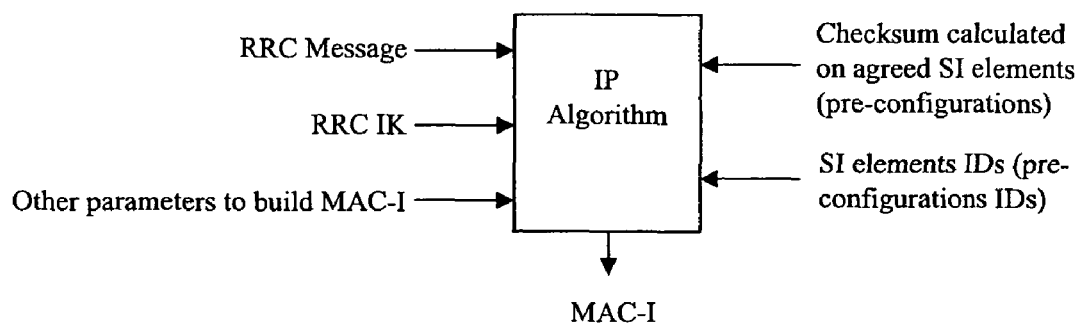
FIG. 12 illustrates a MAC-I entity in accordance with one embodiment of the present invention.

The LTE RRC Connection Request message may include information for connection establishment, information regarding which SI parameters are to be verified, and a MAC-I entity. FIG. 12 illustrates a MAC-I entity. Preferably, MAC-I comprises an RRC message including SI parameters to be verified, a checksum value and other parameters for building MAC-I, such as Integrity Key (IK), Count-I, Fresh, Direction, and others. Preferably, the checksum value is calculated on the SI parameters to be verified, such as agreed SI parameters, constants and timer values. Preferably, the checksum value is calculated in the UE and is a unique identifier for identifying the set of parameters which it was calculated on.

Accordingly, nothing new is sent to the network apart from the information on which pre-configuration IDs/system parameters were used to build MAC-I. Nevertheless, this information is signaled to the network so that the network can be assured that the UE has received this information. Alternatively, the UE might only be allowed to connect to the network if it has acquired a fixed set of system information, as specified or as indicated on the system information, for example. A set of standard SI parameters needed to be verified can also be specified to eliminate the need to communicate it to the network.

In order for the network to be able to calculate a correct MAC, it is preferable that the UE, before transmitting the message including the MAC-I, be informed about which SI parameters/pre-configurations the network knows. This can be received directly with the system information. Preferably, the UE only calculates the check code based on information the network is aware of.

In accordance with an embodiment of the present invention, UE actions are defined in case of an error. For example, if the MAC is incorrect, then the UE can try to resend RRC message pretending that there is no SI/predefined configuration information available in the UE. Accordingly, the UE will erase the current SI and re-read new SI. Alternatively, the network can send the SI in unicast mode in an integrity-protected way.

Preferably, there is no need to verify system information every time the UE wants to connect to the network. Rather, the verification can be limited to when the UE first accesses the network after a new reading of/change in system information. For example, the e-Node B first indicates a set of known configurations. Then, the UE calculates the MAC-I adding information related to its SI parameters/configurations and sends this information in an LTE RRC Connection Request message.

In accordance with another embodiment of the present invention, an attacker may manage to introduce wrong access parameters to the UE (e.g. RACH parameters). Accordingly, initial access to the network can fail. Thus, in case that a RRC message fails for no clear reason (no reply from the network), the UE preferably erases all or some relevant information elements (IE) and re-reads the relevant IE from the network.

Subsequently, if the network connection can still not be established using received system information, the UE can trigger itself to search for another suitable cell with a lower transmission power level (ignore current cell-ID).

Figure 13:
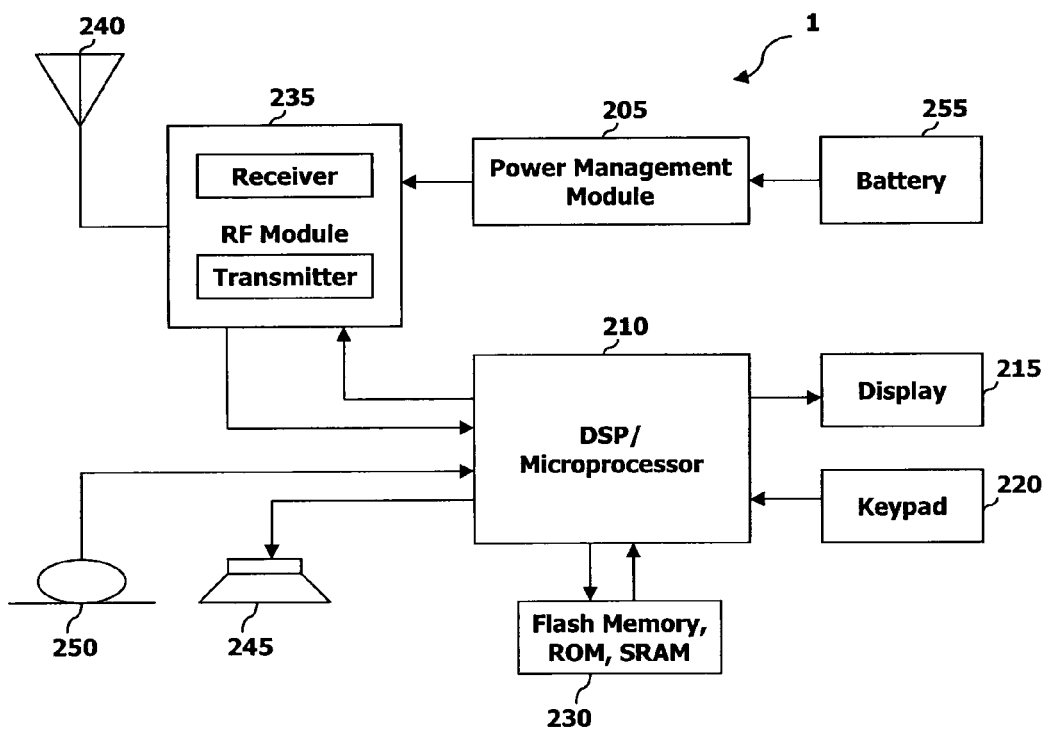
FIG. 13 illustrates a block diagram of a mobile station (MS) or UE in accordance with one embodiment of the present invention.

FIG. 13 illustrates a block diagram of a mobile station (MS) or UE 1 in accordance with the present invention. The UE 1 includes a processor (or digital signal processor) 210, RF module 235, power management module 205, antenna 240, battery 255, display 215, keypad 220, memory 230, speaker 245 and microphone 250.

A user enters instructional information, such as a telephone number, for example, by pushing the buttons of a keypad 220 or by voice activation using the microphone 250. The microprocessor 210 receives and processes the instructional information to perform the appropriate function, such as to dial the telephone number. Operational data may be retrieved from the memory module 230 to perform the function. Furthermore, the processor 210 may display the instructional and operational information on the display 215 for the user's reference and convenience.

The processor 210 issues instructional information to the RF module 235, to initiate communication, for example, transmits radio signals comprising voice communication data. The RF module 235 comprises a receiver and a transmitter to receive and transmit radio signals. An antenna 240 facilitates the transmission and reception of radio signals. Upon receiving radio signals, the RF module 235 may forward and convert the signals to baseband frequency for processing by the processor 210. The processed signals would be transformed into audible or readable information outputted via the speaker 245, for example. The processor 210 also includes the protocols and functions necessary to perform the various processes described herein.

It will be apparent to one skilled in the art that the mobile station 1 may be readily implemented using, for example, the processor 210 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for communicating between a network and a mobile terminal, the method comprising:
  receiving, by the mobile terminal from the network, at least one configuration parameter related to system information prior to establishing a Radio Resource Control (RRC) connection with the network; and
  transmitting, by the mobile terminal to the network, an RRC connection request message for establishing the RRC connection with the network,
  wherein the at least one configuration parameter comprises a system frame number (SNF), radio first layer (L1) parameters, and radio access channel (RACH) parameters,
  wherein the RRC connection request message includes information for verifying authenticity of the at least one configuration parameter,
  wherein the information is calculated by using only a configuration parameter that is known by the network and at least an integrity key or a checksum value, and
  wherein the checksum value, which is calculated at the mobile terminal using the at least one configuration parameter, is a unique identifier for identifying the at least one configuration parameter.

2. The method of claim 1, wherein the information for verifying the authenticity of the at least one configuration parameter is further calculated using at least an RRC message, an identification of the at least one configuration parameter to be verified or a value of the at least one configuration parameter.

3. The method of claim 1, wherein if the at least one configuration parameter is not verified, the method further comprises:
  erasing the at least one un-verified configuration parameter; and
  transmitting a message for establishing a connection with the network.

4. A method for communicating between a network and a mobile terminal, the method comprising:
  transmitting, by the network to the mobile terminal, at least one configuration parameter related to system information prior to establishing a Radio Resource Control (RRC) connection with the network; and
  receiving, by the network from the mobile terminal, an RRC connection request message for establishing the RRC connection with the network,
  wherein the at least one configuration parameter comprises a system frame number (SNF), radio first layer (L1) parameters, and radio access channel (RACH) parameters,
  wherein the RRC connection request message includes information for verifying authenticity of the at least one configuration parameter possessed by the mobile terminal,
  wherein the information is calculated by the mobile terminal using only a configuration parameter that is known by the network and at least an integrity key or a checksum value, and
  wherein the checksum value, which is calculated at the mobile terminal using the at least one configuration parameter, is a unique identifier for identifying the calculated at least one configuration parameter.

5. The method of claim 4, wherein the information for verifying the authenticity of the at least one configuration parameter is further calculated using at least an RRC message, an identification of the at least one configuration parameter to be verified or a value of the at least one configuration parameter.

6. The method of claim 4, wherein if the at least one configuration parameter is not verified, the method further comprises:
  instructing the mobile terminal to erase the at least one un-verified configuration parameter; and
  receiving a message from the mobile terminal for establishing a connection with the network.

7. The method of claim 1, wherein the RRC connection request message comprises a Long Term Evolution (LTE) RRC connection request message used in an LTE system.

8. The method of claim 4, wherein the RRC connection request message comprises a Long Term Evolution (LTE) RRC connection request message used in an LTE system.

* * * * *